United States Patent
Kosaka

(10) Patent No.: US 6,229,641 B1
(45) Date of Patent: *May 8, 2001

(54) OPTICAL AMPLIFIER, METHOD OF CONTROLLING THE OUTPUT LIGHT FROM THE OPTICAL AMPLIFIER, OPTICAL TRANSMISSION SYSTEM AND METHOD OF CONTROLLING AN OPTICAL TRANSMISSION PATH CROSS REFERENCE TO RELATED APPLICATION

(75) Inventor: Junya Kosaka, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,241

(22) Filed: Feb. 8, 2000

Related U.S. Application Data

(63) Continuation of application No. 09/210,543, filed on Dec. 14, 1998, now Pat. No. 6,038,062, which is a continuation of application No. 08/721,734, filed on Sep. 27, 1996, now Pat. No. 5,864,423.

(30) Foreign Application Priority Data

Oct. 3, 1995 (JP) ...................................................... 7-256232

(51) Int. Cl.[7] .......................... H04B 10/08; G01M 11/00; H01S 3/10
(52) U.S. Cl. ........................... 359/337; 359/161; 359/341
(58) Field of Search ..................................... 359/124, 134, 359/160, 161, 177, 194, 337, 341

(56) References Cited

U.S. PATENT DOCUMENTS

| | | |
|---|---|---|
| 5,268,786 | 12/1993 | Matsushita et al. . |
| 5,381,257 | 1/1995 | Ferror . |
| 5,396,360 * | 3/1995 | Majima ................................ 359/161 |
| 5,436,750 * | 7/1995 | Kawano ............................... 359/177 |
| 5,463,487 | 10/1995 | Epworth . |
| 5,500,756 | 3/1996 | Toshime et al. . |
| 5,506,724 | 4/1996 | Shimizu et al. . |
| 5,644,423 | 7/1997 | Iwano . |
| 5,664,131 | 9/1997 | Sugiya . |
| 5,675,432 | 10/1997 | Kosaka . |
| 5,812,289 * | 9/1998 | Tomooka et al. ..................... 359/115 |
| 5,864,423 * | 1/1999 | Kosaka ................................ 359/341 |
| 6,038,062 * | 3/2000 | Kosaka ................................ 359/337 |

FOREIGN PATENT DOCUMENTS

| | | |
|---|---|---|
| 5-292033 * | 11/1993 | (JP) . |
| 6-152034 | 4/1994 | (JP) . |
| 6-216452 | 5/1994 | (JP) . |
| 6216452 * | 8/1994 | (JP) . |
| 7-015055 | 1/1995 | (JP) . |

OTHER PUBLICATIONS

Blank et al., Journal of Lightwave Technology, vol. 7, No. 10, pp. 1549–1555, Oct. 1989.*

* cited by examiner

Primary Examiner—Nelson Moskowitz
(74) Attorney, Agent, or Firm—Antonelli, Terry, Stout & Kraus, LLP

(57) ABSTRACT

An optical transmission path monitoring and controlling method including the steps of monitoring a probe light beam and other multiplexed light beams which are included in a multiplex light ray propagated through a transmission path in an optical transmission system, detecting values of the monitored probe light beam and other multiplexed light beams, while the other multiplexed light beams are in a multiplexed state, in relation to predetermined values, respectively. A determination is made based upon the detected value of whether or not at least one of an optical transmission path trunk line, the probe light beam per se, the other multiplexed light beams per se, an optical amplifier and a transmitter is normal.

11 Claims, 7 Drawing Sheets

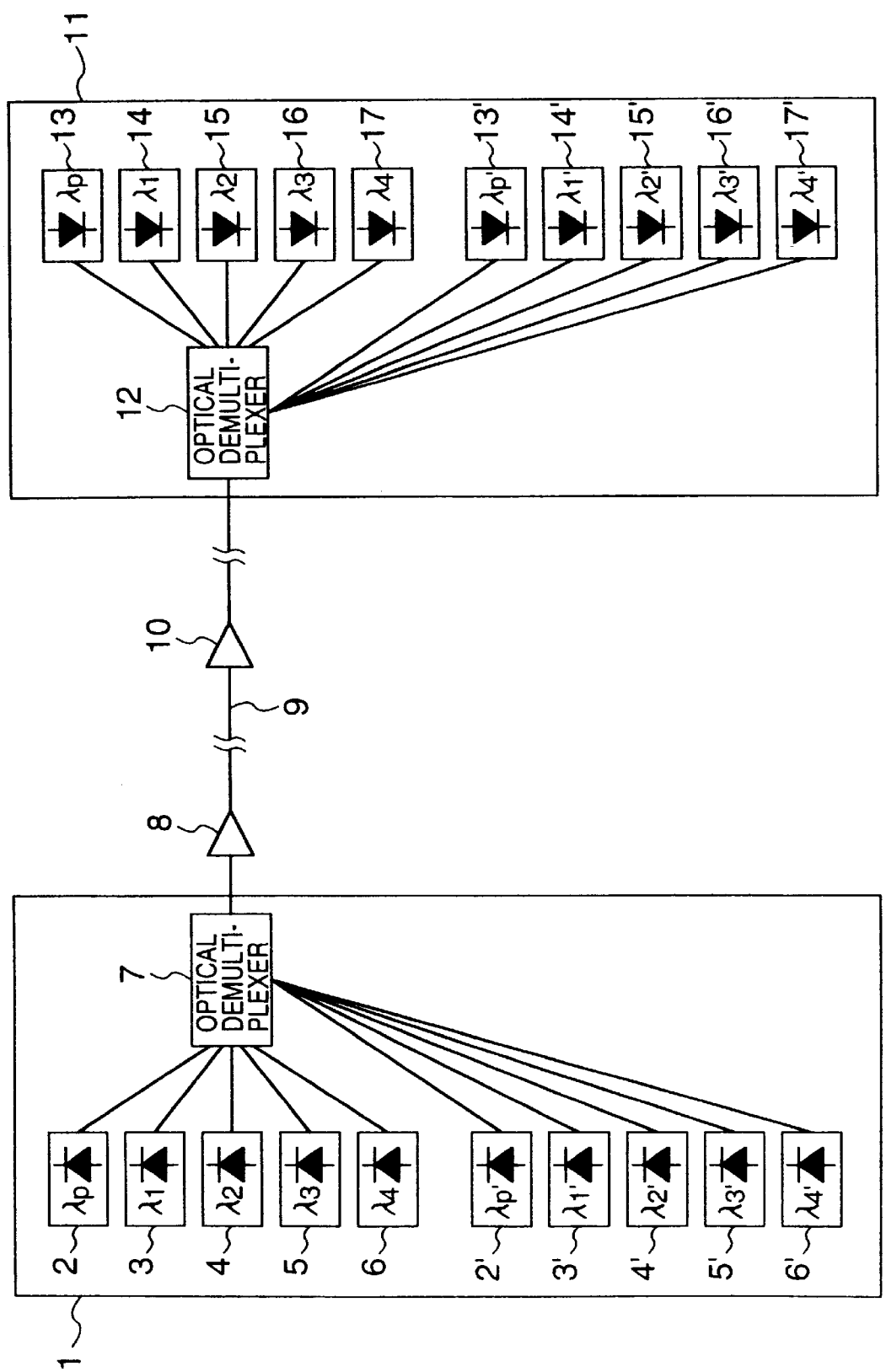

FIG.7

| STATE | DECISION | SIGNALS GENERATED BY INPUT DETECTING UNIT | MONITOR SIGNALS SELECTED BY SELECTOR 30A | REFERENCE VOLTAGES SELECTED BY SELECTOR 30B | EXCITING CURRENT CONTROL |
|---|---|---|---|---|---|
| $\lambda p >$ REFERENCE VOLTAGE 39 AND $\lambda p, \lambda p$-4 > REFERENCE VOLTAGE 41 | TRUNK LINE SYSTEM IS NORMAL AND PROBE LIGHT BEAM IS NORMAL | 1ST OPERATION SIGNAL | LIGHT RECEIVING UNIT 28 | REFERENCE VOLTAGE 31A | FEEDBACK CONTROL BY $\lambda p$ |
| $\lambda p >$ REFERENCE VOLTAGE 39 AND $\lambda p, \lambda p$-4 > REFERENCE VOLTAGE 41 | TRUNK LINE SYSTEM IS NORMAL AND PROBE LIGHT BEAM IS ABNORMAL | 2ND OPERATION SIGNAL | LIGHT RECEIVING UNIT 27 | REFERENCE VOLTAGE 31B | FEEDBACK CONTROL BY $\lambda p$ AND $\lambda 1$ TO $\lambda 4$ |
| $\lambda p >$ REFERENCE VOLTAGE 39 AND $\lambda p, \lambda p$-4 > REFERENCE VOLTAGE 41 | TRUNK LINE SYSTEM AND TRANSMITTER ARE ABNORMAL | 3RD OPERATION SIGNAL | / | / | (CURRENT DECREASE OR STOP) (ALARM RAISED BY ALARM CIRCUIT 53) |
| $\lambda p >$ REFERENCE VOLTAGE 39 AND $\lambda p, \lambda p$-4 > REFERENCE VOLTAGE 41 | TRANSMIYYER IS ABNORMAL AND PROBE LIGHT BEAM IS NORMAL | 3RD OPERATION SIGNAL | / | / | (CURRENT DECREASE OR STOP) (ALARM RAISED BY ALARM CIRCUIT 53) |

OPTICAL AMPLIFIER, METHOD OF CONTROLLING THE OUTPUT LIGHT FROM THE OPTICAL AMPLIFIER, OPTICAL TRANSMISSION SYSTEM AND METHOD OF CONTROLLING AN OPTICAL TRANSMISSION PATH CROSS REFERENCE TO RELATED APPLICATION

CROSS REFERENCE TO RELATED APPLICATION

This is a continuation of U.S. application Ser. No. 09/210,543, filed Dec. 14, 1998, now U.S. Pat. No. 6,038,062, which is a continuation of U.S. application Ser. No. 08/721,734, filed Sep. 27, 1996, now U.S. Pat. No. 5,864,423, issued Jan. 26, 1999, the subject matter of which is incorporated by reference herein.

BACKGROUND OF THE INVENTION

The present invention relates to an optical amplifier used in a multiplexed optical transmission path, a method of controlling a multiplexed light output delivered out of the optical amplifier, an optical transmission system using the optical amplifier and a method of monitoring and controlling the optical transmission path for transmission of the multiplexed light output.

In recent years, with the demand for reducing the cost of an optical communication system, a so-called wavelength multiplexing optical transmission scheme has been studied in which two or more kinds of signal light beams of different wavelengths are multiplexed and transmitted through a single optical transmission fiber. Since the optical amplifier has a wide amplifying wavelength band and can afford to perform amplification at low noise, it is suitable for use as an amplifier in the wavelength multiplexing optical transmission. A rare earth added optical fiber constituting the optical amplifier and a semiconductor optical amplifier have each the gain which has wavelength dependency and therefore, there occurs a difference in light output or gain between wavelengths after amplification. Specifically, the inter-wavelength difference is accumulated in the course of multi-stage relay based on optical amplifiers and after the relay, the difference in optical power between wavelengths is extended. As a result, the maximum relay transmission distance of the whole system is limited by a degraded S/N ratio of a wavelength of the multiplexed wavelengths which has the lowest power. Accordingly, it is of importance to provide an optical amplifier which does not cause the light output difference between wavelengths.

Thus, for example, a scheme described as "Flattening of Multi-wavelength Amplifying Characteristics in Optical Fiber Amplifier Using Fiber Mu-factor Control" in The Institute of Electronics and Information and Communication Engineers of Japan, Technical Report OCS94-66, OPE94-88 (1994-11) has been known as a conventional scheme.

The conventional scheme uses a fiber gain controller (AFGC) for monitoring the total output of four signal light beams subject to wavelength multiplexing and controlling the fiber gain such that the output level becomes constant. Through this, the inter-input wavelength difference is made to be 0 dB and the fiber gain is controlled to a constant value of 12 dB so as to minimize the difference between wavelengths. Further, by using an auto-power controller (APC) based on an optical attenuator 58, light loss is adjusted while keeping the fiber gain constant at 12 dB to make the fiber gain spectrum unchanged even when the relay mu-factor is changed.

Typically, in a practical system of wavelength multiplexing transmission, transmitting signal information pieces represented by wavelengths are often independent of each other. In this case, only necessary signals are transmitted and there is a possibility that unnecessary signals are stopped, that is, placed in standby condition.

However, in the conventional scheme in which the total output of multiplexed four signal light beams is monitored and controlled, when the number of multiplexed signal wavelengths is changed, the total output remains unchanged but outputs of signal light beams of individual wavelengths change greatly. With the outputs of signal light beams greatly changed in this manner, there arise problems that signal transmission is adversely affected and that when the outputs exceed a signal transmission distance limit, the signal transmission becomes impossible.

Further, in the conventional scheme in which the total light output is controlled, when the output of one signal light beam decreases, this decrease adversely affects the signal transmission.

SUMMARY OF THE INVENTION

An object of the present invention is to provide an optical amplifier which can control individual wavelength outputs without greatly affecting signal transmission even when the number of signal wavelengths subject to multiplexing changes and an optical transmission system using the optical amplifier.

Another object of the present invention is to provide a method of monitoring a probe light beam included in a multiplexed light ray propagated through a transmission path in the optical transmission system and controlling an output of the probe light beam and outputs of the multiplexed light beams from the optical amplifier in accordance with a result of monitoring.

Another object of the present invention is to provide an optical transmission path monitoring and controlling method which can decide whether or not an optical transmission path trunk line, a probe light beam per se, multiplexed light beams per se, an optical amplifier and a transmitter are normal by monitoring the probe light beam and other multiplexed light beams included in the multiplexed light ray propagated through a transmission path in an optical transmission system and detecting what values the probe light beam and the other multiplexed light beams take in relation to predetermined values, respectively.

To accomplish the above objects, the present invention comprises an optical amplifying medium to which input multiplexed light beams are guided, an exciting source for exciting the optical amplifying medium, light branching means for branching part of the multiplexed light beams amplified by the optical amplifying medium, light separating means for separating a probe light beam from multiplexed light beams branched by the light branching means, light receiving means for detecting an output of the probe light beam separated by the light separating means and converting the detected output into an electric signal, and control means for controlling an amount of operation of the exciting source on the optical medium such that an output of the light receiving means becomes constant, and with the construction as above, the output of the probe light beam can be rendered to be constant, the outputs of the signal light beams can be rendered to be constant and even when the number of signal wavelengths subject to multiplexing changes at that time, the individual wavelengths can be controlled without greatly affecting the signal transmission.

Preferably, the above optical amplifier further comprises second light receiving means for detecting outputs of multiplexed light beams branched by the light branching means, second light branching means arranged to precede the optical amplifying medium and operative to branch part of the multiplexed light beams guided to the optical amplifying medium, second light separating means for separating the probe light beam from the multiplexed light beams branched by the second branching means, third and fourth light receiving means for detecting the output of the probe light beam branched by the second light separating means and the outputs of the multiplexed light beams branched by the second branching means, respectively, and input detecting means for delivering a command to the control means when the output of the probe light beam detected by the third light receiving means is lower than a predetermined value and the outputs of the multiplexed light beams detected by the fourth light receiving means are higher than a predetermined value, and the control means controls the amount of operation of the exciting source on the optical medium such that the output of the second light receiving unit becomes constant, so that with the above construction, event when the probe light beam becomes abnormal, all of the multiplexed light beams can be controlled.

Preferably, the optical amplifier further comprises alarm means for informing abnormality, the input detecting means delivers a signal to the alarm means when the output of the probe light beam and the outputs of the multiplexed light beams are lower than the predetermined values, respectively, so as to actuate the alarm means, and with the above construction, even when abnormality occurs, the abnormality can be informed easily.

Preferably, in the optical amplifier, the optical amplifying medium is a rare earth added optical fiber, the exciting source is a pump laser, and with the above construction, the amplification degree for signal light beams can be increased.

Preferably, the optical amplifier further comprises correcting means for calculating a difference between outputs of the first and second light receiving units and correcting a reference value, included in the control means and used to control the probe light beam to a constant value, in such a manner that the difference becomes a predetermined value, and with the above construction, the output during laying can be made to be equal to that during initial adjustment.

Preferably, in the optical amplifier, the light separating means includes first and second optical couplers each having four ports and an optical filter for selectively passing a light beam of a predetermined wavelength, the multiplexed light beams branched by the light branching means are guided to the first port of the first optical coupler, multiplexed light beams delivered out of the fourth port are detected by the second light receiving means, the multiplexed light beams branched by the light branching means are guided to the first port of the first optical coupler, multiplexed light beams delivered out of the third port are guided to the optical filter and are further guided to the third port of the second optical coupler, the probe light beam delivered out of the second port is detected by the second light receiving unit, multiplexed light beams branched by the second light branching means are guided to the first port of the second optical coupler, multiplexed light beams delivered out of the fourth port are detected by the fourth light receiving unit, multiplexed light beams branched by the second light branching means are guided to the first port of the second optical coupler, multiplexed light beams delivered out of the third port are guided to the optical filter and further guided to the third port of the first optical coupler, and the probe light beam delivered out of the second port is detected by the first light receiving unit, and with the above construction, the construction of the light separator can be simplified.

Preferably, the optical amplifier further comprises combining means for combining the probe light beam delivered out of the separating means with light beams in the stage preceding the optical amplifying medium, and with the above construction, even when the probe light beam becomes abnormal, the succeeding trunk line system cannot be affected thereby.

The present invention comprises a light transmitting apparatus for multiplexing a plurality of signal light beams inclusive of a probe light beam and delivering a multiplex light ray to a trunk line system constructed of an optical fiber, an optical amplifier provided midway of the trunk line system and operative to separate the probe light beam from the light signal delivered out of the light transmitting apparatus and control the mu-factor for the input light beams such that an output of the probe light beam becomes constant, and a light receiving apparatus for receiving a light signal amplified by the optical amplifier and transmitted to the trunk line system, and with the above construction, even when the number of signal wavelengths to be multiplexed changes, signal transmission cannot be affected thereby and the individual wavelength outputs can be controlled.

Preferably, in an optical transmission system using the optical amplifier, the light transmitting apparatus includes a plurality of transmitters for transmitting signal light beams and a probe light beam transmitter for constantly transmitting the probe light beam independently of the plurality of transmitters, and with the above construction, outputs of the signal light beams can be controlled without affecting the signal light beams.

Preferably, in the optical transmission system using the optical amplifier, the light transmitting apparatus includes a plurality of transmitters for transmitting signal light beams, one of the signal light beams transmitted from the plurality of transmitters is used as the probe light beam, and with the above construction, the transmission amount of information of the signal light beams can be increased without requiring the provision of a separate probe light beam.

Preferably, in the optical transmission system using the optical amplifier, the outputs of individual wavelengths from the transmitters are made to be substantially equal to each other, and with the construction as above, the signal light beams can be controlled with ease.

Preferably, in the optical transmission system using the optical amplifier, the output of the probe light beam is made to be higher than the outputs of the signal light beams from the transmitters, and with the construction above, even when the transmission distance of the trunk lien system is increased and input signal light beams are decreased, the probe light beam can be detected to ensure that outputs of the signal light beams can be amplified and transmitted through the long distance.

Preferably, in the optical transmission system using the optical amplifier, the output of the probe light beam transmitter is made to be lower than the outputs of the signal light beam transmitters, and with the above construction, the outputs of the signal light beams can be increased.

Preferably, in the optical transmission system using the optical amplifier, a wavelength distance between the probe light beam and an adjacent signal light beam is made to be different from that between the signal light beams, and with the above construction, accuracies of the light outputs can be improved.

Preferably, in the optical transmission system using the optical amplifier, the probe light beam has a wavelength positioned at a short wavelength end or a long wavelength end of the signal light beams, and with the above construction, separation of the probe light beam can be facilitated.

BRIEF DESCRIPTION OF THE DRAWINGS

FIG. 6 is a block diagram showing the schematic construction of an optical transmission system according to another embodiment of the present invention.

FIG. 7 is a table showing a transmission system control method of the present invention.

DESCRIPTION OF THE PREFERRED EMBODIMENTS

Various embodiments of the present invention will be described hereunder in greater detail with reference to the drawings.

Figure 1:
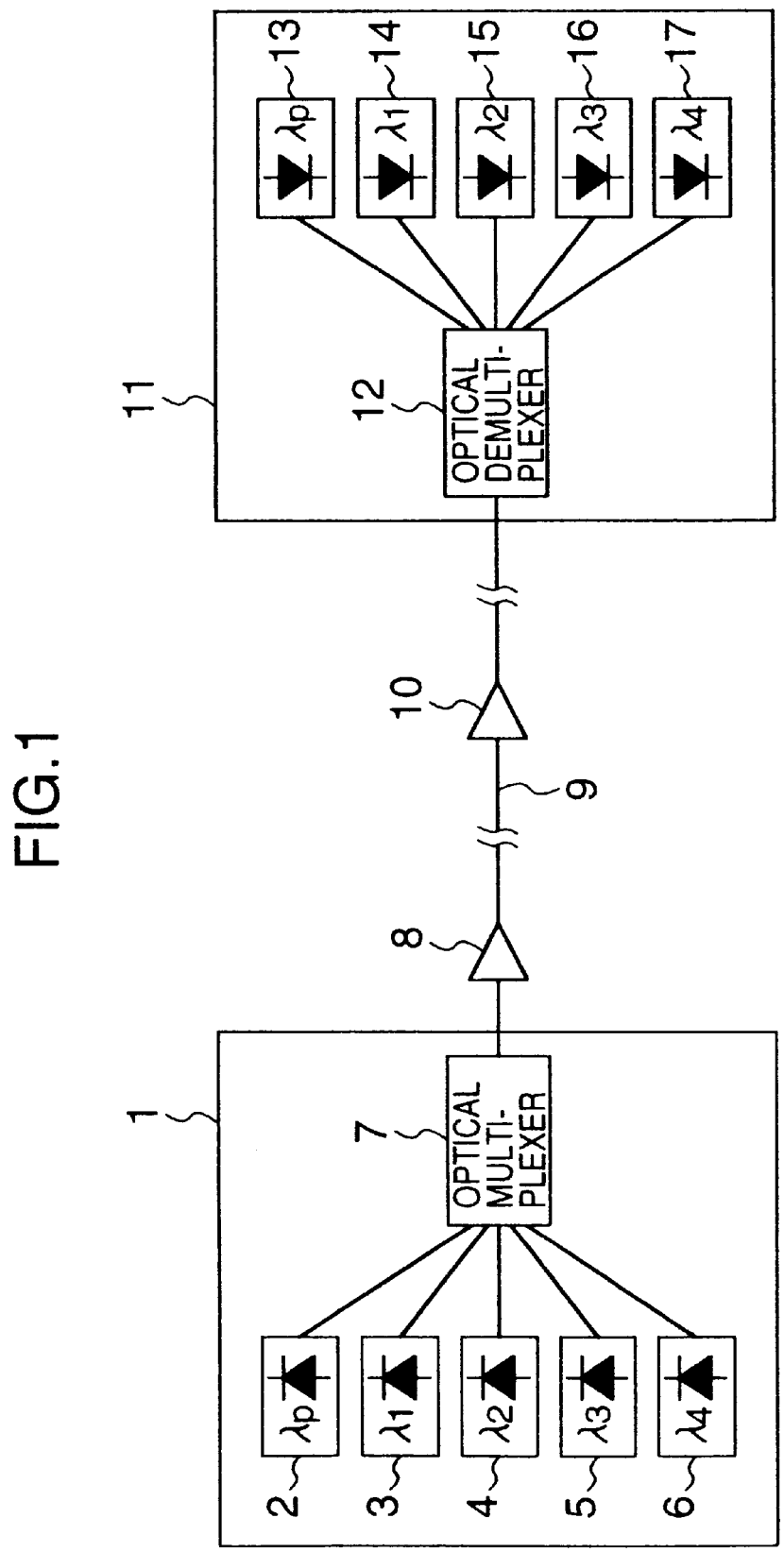
FIG. 1 is a block diagram showing the schematic construction of an optical transmission system according to an embodiment of the present invention.

FIG. 1 is a system construction diagram of an optical transmission system according to a practical form of the present invention.

A light transmitting apparatus 1 comprises a transmitter 2 for transmitting a probe light beam having a wavelength $\lambda_p$=1545 nm, a transmitter 3 for transmitting a signal light beam of a wavelength $\lambda_1$=1547 nm, a transmitter 4 for transmitting a signal light beam of $\lambda_2$=1550 nm, a transmitter 5 for transmitting a signal light beam of $\lambda_3$=1553 nm, a transmitter 6 for transmitting a signal light beam of $\lambda_4$=1556 nm, and an optical multiplexer 7 for multiplexing the light beams from the transmitters 3, 4, 5 and 6 and delivering multiplexed light beams to the same optical fiber. Here, the probe light beam $\lambda_p$ is constantly delivered regardless of the presence or absence of the signal light beams $\lambda_1$, $\lambda_2$, $\lambda_3$ and $\lambda_4$. While a wavelength distance between adjacent ones of the signal light beams $\lambda_1$, $\lambda_2$, $\lambda_3$ and $\lambda_4$ is 3 nm, a wavelength distance between the probe light beam $\lambda_p$ and the signal light beam $\lambda_1$ in the close proximity thereof is 2 nm. A light output of the probe light beam $\lambda_p$ and a light output of each of the signal light beams $\lambda_1$, $\lambda_2$, $\lambda_3$ and $\lambda_4$ are each +10 dBm.

The light beams multiplexed by the light transmitting apparatus 1 are amplified by an optical amplifier 8 and are then delivered to a trunk line system 9. At that time, the mu-factor of the optical amplifier 8 is controlled such that the probe light beam $\lambda_p$ and each of the signal light beams $\lambda_1$, $\lambda_2$, $\lambda_3$ and $\lambda_4$ have each a light output power level of +10 dBm. The optical amplifier 8 branches the probe light beam from the inputted probe light beam $\lambda_p$ and signal light beams $\lambda_1$, $\lambda_2$, $\lambda_3$ and $\lambda_4$ and controls the mu-factor by performing feedback such that the output of the probe light beam becomes constant. Since the probe light beam $\lambda_p$ and signal light beams $\lambda_1$, $\lambda_2$, $\lambda_3$ and $\lambda_4$ which are 100 km transmitted through the trunk line system 9 undergo loss and variation to change to about −20 dBm to 0 dBm, they are compensated for optical loss by another optical amplifier 10 provided midway of the trunk line system 9 to be stabilized by the amplifier and thereafter, again delivered to the trunk line system 9. Light output power levels stabilized by the optical amplifier 10 are each about +10 dBm.

Further, the multiplex light ray delivered to the trunk line systems 9 is 100 km transmitted and then inputted to a light receiving apparatus 11 includes an optical demultiplexer 12 for demultiplexing the probe light beam $\lambda_p$ and signal light beams $\lambda_1$, $\lambda_2$, $\lambda_3$ and $\lambda_4$ and light receivers 13, 14, 15, 16 and 17 provided for the respective wavelengths.

Here, the present optical transmission system features that the light transmitting apparatus 1 includes not only the transmitters of signal light beams but also the transmitter of probe light beams. As will be described later with reference to FIG. 2 and ensuing figures, the optical amplifier used in the trunk line system separates the probe light beam from the light beams transmitted in a wavelength multiplexed form through the trunk line system and controls the gain of an optical amplifying medium included in the optical amplifier such that the intensity of the probe light beam is rendered to be constant. Accordingly, even when the number of signal light beams subject to wavelength multiplexing decreases from four to three or the intensity of one signal light beam decreases, respective wavelength outputs can be controlled without greatly affecting the signal transmission.

Namely, according to the present practical form, even when the number of signals undergoing wavelength multiplexing changes or the output of one signal light beam decreases, the respective wavelength outputs can be controlled without greatly affecting the signal transmission.

Figure 2:
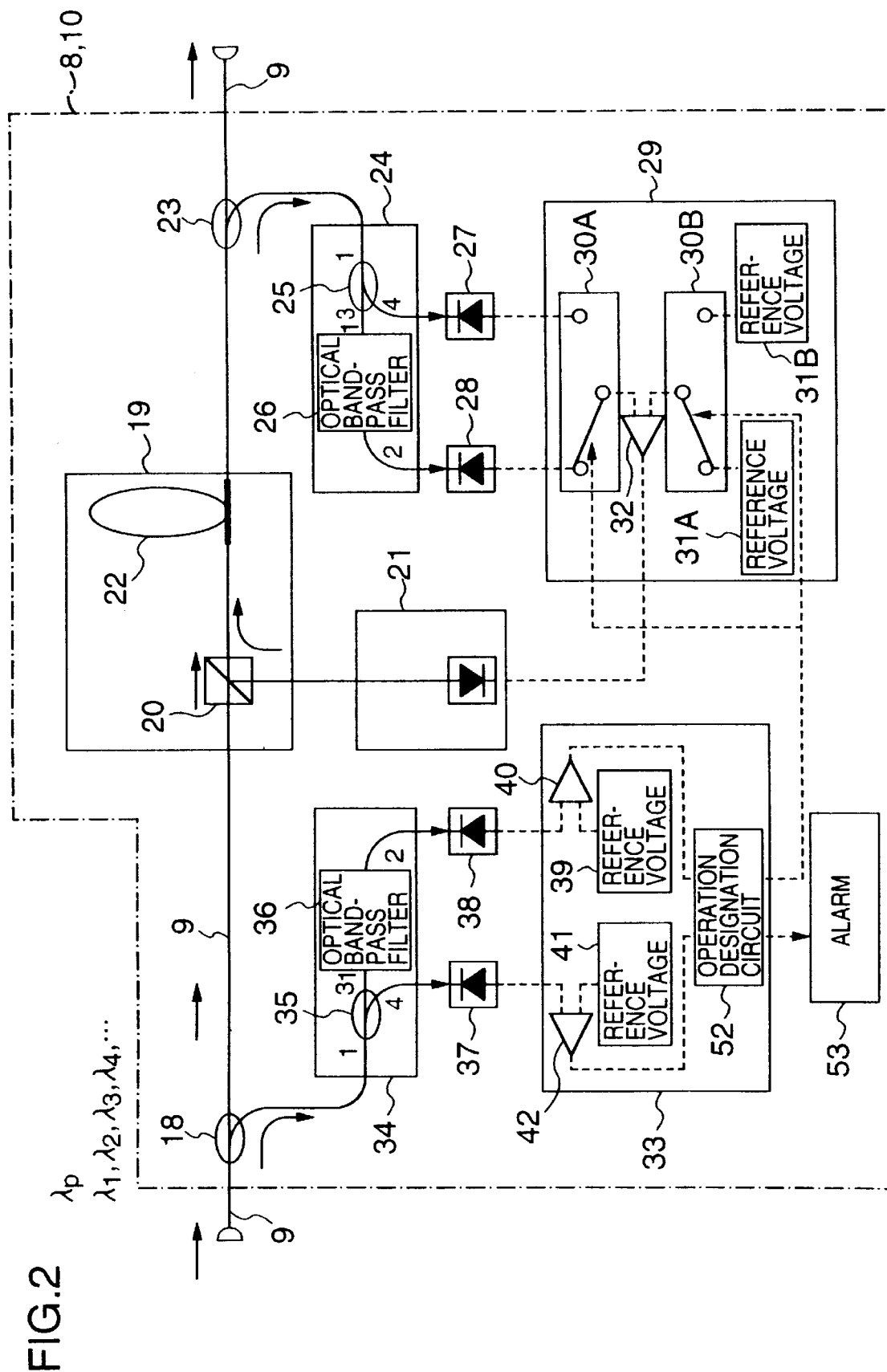
FIG. 2 is a block circuit diagram showing the detailed construction of an optical amplifier in the first embodiment.

Referring now to FIG. 2, the internal construction of the optical amplifier will be described.

FIG. 2 is a functional block diagram of an optical amplifier according to a practical form of the present invention.

The probe light beam $\lambda_p$ and signal light beams $\lambda_1$, $\lambda_2$, $\lambda_3$ and $\lambda_4$ from the trunk line system 9 are inputted to an input terminal of the optical amplifier 8 or 10 through the same optical fiber. The trunk line system 9 in a practical system has irregularities in light loss and distance and therefore, the input light power changes to about −20 dBm to 0 dBm. Most of the input probe light beam $\lambda_p$ and signal light beams $\lambda_1$, $\lambda_2$, $\lambda_3$ and $\lambda_4$ pass through a 5:95 optical coupler 18 standing for first light branching means and fed to an optical amplifying medium 19.

The optical amplifying medium 19 includes an optical combining unit 20 for combining a pump light beam from a pump laser 21 serving as an exciting source, and an erbium added optical fiber 22 for receiving a light beam combined by the optical combining unit 20. The light beam guided to an input terminal of the erbium added optical fiber 22 is amplified inside the erbium added optical fiber 22 and delivered from an output terminal. Most of a delivered light beam passes through a 5:95 optical coupler 23 standing for second light branching means and is delivered from an output terminal of the optical amplifier 8 or 10 to the trunk line system 9.

Part of the light beam is branched by the 5:95 optical coupler 23 and inputted to first wavelength separating means 24. The wavelength separating means 24 includes a 50:50 optical coupler 25 and an optical band-pass filter 26 having a pass wavelength band of $\lambda_p \pm$nm.

A light beam inputted from a port 1 of the 50:50 optical coupler 25 is 50:50 branched from ports 4 and 3 and the probe light beam $\lambda p$ and the signal light beams $\lambda 1$, $\lambda 2$, $\lambda 3$ and $\lambda 4$ are delivered. The light beam delivered out of the port 3 of the 50:50 optical coupler 25 is inputted from a port 1 of the optical band-pass filter 26 and only a light beam of $\lambda p$ standing for the probe light beam is passed to a port 2.

Of the thus separated light beams, the probe light beam $\lambda p$ and signal light beams $\lambda 1$, $\lambda 2$, $\lambda 3$ and $\lambda 4$ which are delivered out of the port 4 of the 50:50 optical coupler 25 are monitored by a first light receiving unit 27 and the probe light beam $\lambda p$ delivered out of the port 2 of the optical band-pass filter 26 is monitored by a second light receiving unit 28.

Either one of monitor signals is selected for transfer by means of a selector 30A inside a controller 29 and is compared with a reference voltage 31A or 31B selected by a selector 30B and corresponding to a predetermined output level by means of a comparator 32 to generate an error signal. Structurally, a drive current of the laser pump 21 is feedback-controlled by the error signal obtained from the comparator 32.

Here, when an input detecting unit 33 generates a first operation signal, the selector 30A selects the monitor signal from the light receiving unit 28 and with a second operation signal generated, the monitor signal from the light receiving unit 27 is selected. The selector 30B selects a reference voltage from the reference voltage 31A when the input detecting unit 33 generates the first operation signal and selects a reference voltage from the reference voltage 31B when the second operation signal is generated.

The operation of the input detecting unit 33 will be described later but it normally generates the first operation signal to control a signal of probe light beam detected by the light receiving unit 28 such that the signal is rendered to be equal to the reference voltage. When an abnormality occurs in the probe Light beam, the input detecting unit 33 generates the second operation signal to selectively switch the selector 30A or 30B.

With the above construction, when the trunk line system is normal and the probe light beam is normally inputted, the drive current of the pump laser 21, that is, the amount of operation on the erbium added optical fiber serving as the optical amplifying medium of the pump laser standing for the exciting source is feedback-controlled such that the light output of the probe light beam $\lambda p$ monitored by the light receiving unit 28 can be kept to be constant. This keeps the gain state in the erbium added optical fiber 22 constant and hence makes it possible to keep constant the optical gain states (outputs) of the plurality of signal light beams $\lambda 1$, $\lambda 2$, $\lambda 3$ and $\lambda 4$ which are inputted concurrently. As a result, the light outputs of the signal light beams $\lambda 1$, $\lambda 2$, $\lambda 3$ and $\lambda 4$ can each be maintained at a predetermined value and can be stabilized.

Here, the optical amplifying medium 19 may alternatively be a semiconductor optical amplifier and in this case, the pump laser 21 provides an exciting current. Namely, by controlling the exciting current acting as the exciting source, the amount of operation on the semiconductor optical amplifier standing for the optical amplifying medium can be feedback-controlled.

On the other hand, the probe light beam $\lambda p$ and signal light beams $\lambda 1$, $\lambda 2$, $\lambda 3$ and $\lambda 4$ which are partly branched by the first 5:95 optical coupler are inputted to second wavelength separating means 34. The wavelength separating means 34 includes a 50:50 optical coupler 35 and an optical band-pass filter 36 having a pass wavelength band of $\lambda p+1$ nm.

The 50:50: optical coupler 35 passes the probe light beam $\lambda p$ and signal light beams $\lambda 1$, $\lambda 2$, $\lambda 3$ and $\lambda 4$ from a port 1 to a port 4. A light beam from a port 3 of the 50:50 optical coupler 35 is inputted to a port 1 of an optical band-pass filter 36 so that only a light beam of $\lambda p$ standing for the probe light beam may be passed through a port 2. Of the thus separated light beams, the probe light beam $\lambda p$ and signal light beams $\lambda 1$, $\lambda 2$, $\lambda 3$ and $\lambda 4$ delivered out of the port 4 of the 50:50 optical coupler 35 are monitored by a third light receiving unit 37 and the probe light beam $\lambda p$ delivered out of the port 2 of the optical band-pass filter 36 is monitored by a fourth light receiving unit 38.

The probe light beam $\lambda p$ monitored by the light receiving unit 38 is compared with a predetermined reference voltage 39 inside the input detecting unit 33 by means of a comparator 40 and compared information is transmitted to an operation designating circuit 52. The probe light beam $\lambda p$ and signal light beams $\lambda 1$, $\lambda 2$, $\lambda 3$ and $\lambda 4$ which are monitored by the light receiving unit 37 are compared with a predetermined reference voltage 41 by means of a comparator 42 and compared information is transmitted to the operation designating circuit 52.

When the probe light beam $\lambda p$ is selected to a short wavelength end or a long wavelength end of the signal light beams $\lambda 1$, $\lambda 2$, $\lambda 3$ and $\lambda 4$, a low-pass filter or a high-pass filter for filtering off the probe light beam $\lambda p$ from the multiplex light beam can be used as the optical band-pass filter 26 or 36 and the construction of the optical band-pass filter can be simplified.

In this case, by using an optical separating unit as the first or second wavelength separating means (24, 34), the construction can further be simplified.

The probe light beam $\lambda p$ is constantly emitted. Therefore, when the probe light beam is higher than the predetermined value and the probe light beam $\lambda p$ and signal light beams $\lambda 1$ to $\lambda 4$ which are monitored by the light receiving unit 37 are also higher than the predetermined value, the connection state of the trunk line system 9 is determined to be good and the operation designating circuit 52 transmits the first operation signal to the selector 30A inside the controller 29 so that the output signal of the light receiving unit 28 may be so connected as to be inputted to the comparator 32. At the same time, the first operation signal is transmitted to the selector 30B so that the reference voltage 31A may be so connected as to be inputted to the comparator 32. Thus, when the probe light beam $\lambda p$ is higher than the predetermined value and the probe light beam $\lambda p$ and signal light beams $\lambda 1$ to $\lambda 4$ which are monitored by the light receiving unit 37 are higher than the predetermined value, the output of the light receiving unit 28 is controlled such that it becomes equal to the reference voltage 31A and the drive current of the pump laser 21 is feedback-controlled such that the optical output of the probe light beam $\lambda p$ can be kept to be constant as described previously.

When the probe light beam $\lambda p$ monitored by the light receiving unit 38 is higher than the predetermined value and the probe light beam $\lambda p$ and signal light beams $\lambda 1$ to $\lambda 4$ which are monitored by the light receiving unit 37 are lower than the predetermined value, it is determined that the signal light beam $\lambda 1$, $\lambda 2$, $\lambda 3$ or $\lambda 4$ by itself becomes abnormal and the operation designating circuit 52 sends a third operation signal to an alarm circuit to cause the alarm circuit 53 to raise the alarm.

Alternatively, control may be performed such that the third operation signal is used to lower the drive current of the pump laser 21 so as to prevent superfluous optical amplification.

When the probe light beam $\lambda p$ monitored by the light receiving unit 38 is lower than the predetermined value and the probe light beam $\lambda p$ and signal light beams $\lambda 1, \lambda 2, \lambda 3$ and $\lambda 4$ which are monitored by the light receiving unit 37 are higher than the predetermined value, it is determined that the probe light beam $\lambda p$ by itself becomes abnormal and the operation designating circuit 52 transmits the second operation signal to the selector 30A inside the controller 29 so that the output signal of the light receiving unit 27 may be so connected as to be inputted to the comparator 32 by means of the operation designating unit 52. At the same time, the second operation signal is also transmitted to the selector 30B so that the reference voltage 31B may be so connected as to be inputted to the comparator 32. Thus, when the probe light beam $\lambda p$ is lower than the predetermined value, the output of the light receiving unit 27 is controlled such that it becomes equal to the reference voltage 31B. At that time, it is determined that the probe light beam $\lambda p$ by itself becomes abnormal in spite of the fact that the trunk line system 9 is normal, and the drive current of the pump laser 21 is feed back controlled such that light outputs of the signal light beams $\lambda 1, \lambda 2, \lambda 3$ and $\lambda 4$ which are monitored by the light receiving unit 27 can be kept to be constant. In this manner, signal light beam output levels can be controlled such that they are not raised abnormally in the absence of the probe light beam $\lambda p$. The state that the probe light beam is absent means a state in which the probe light beam is not delivered for some causes (for example, a failure of the laser). At that time, given that the transmitted signal output of each of the signal light beams $\lambda 1, \lambda 2, \lambda 3$ and $\lambda 4$ is 10 dBm, the signal light beams are controlled such that the output of each of all the four multiplexed light beams $\lambda 1, \lambda 2, \lambda 3$ and $\lambda 4$ is +16 dBm.

In the event that the probe light beam by itself is suddenly stopped, the alarm is transmitted from the operation designating circuit 52 to the selector 30A and 30B at a speed of about 500 μs. Receiving this signal, the selectors 30A and 30B are switched at a speed of about 50 μs. Since the erbium added optical fiber 22 has a response time of about 1 to 10 ms which is sufficiently slower than the alarm transmitting speed, the optical power as a whole can be controlled without causing the optical output to be increased abruptly and excessively.

By repairing the probe light beam while the second operation signal is generated, that is, while the optical outputs of the signal light beams $\lambda 1, \lambda 2, \lambda 3$ and $\lambda 4$ are kept to be constant, a suitable system state can be maintained without making the signal transmission abnormal and reliability of the system can be improved.

Instead of using the two reference voltages such as the reference voltages 31A and 31B and switching them for use, a single reference voltage can alternatively be used by changing sensitivity of the light receiving unit 28 and that of the light receiving unit 27 such that, for example, an output electric signal has the same value when a light signal of 10 dBm is inputted to the light receiving unit 28 as when a light signal of 16 dBm is inputted to the light receiving unit 27 to thereby make the sensitivity of the light receiving unit 27 lower than that of the light receiving unit 28.

When the probe light beam $\lambda p$ monitored by the light receiving unit 38 is lower than the predetermined value and the probe light beam $\lambda p$ and signal light beams $\lambda 1, \lambda 2, \lambda 3$ and 4 which are monitored by the light receiving unit 37 are also lower than the predetermined value, it is determined that the trunk line system is abnormal and the operation designating circuit 52 sends the third operation signal to the alarm circuit 53 to cause it to raise the alarm.

Alternatively, control may be performed such that the third operation signal is used to lower the drive current of the pump laser 21 so as to prevent superfluous optical amplification.

The transmission system control method in the present practiced form described previously will be summarized as shown in Table of FIG. 7. The present example is described as being a method of monitoring of abnormality of the trunk line system in the decision procedure but the trunk line system may be not only the transmission fiber but also a system inclusive of the optical amplifier of the preceding stage.

In order to set the light outputs of the plurality of wavelengths $\lambda 1, \lambda 2, \lambda 3$ and $\lambda 4$ to the same level as far as possible, it is preferable to use the erbium added optical fiber 22 in which flatness of the gain is realized as far as possible within the region of wavelengths to be multiplexed.

In the present practical form, transmitting power of the probe light beam equals that of other wavelengths but for facilitation of detection, transmitting power of the probe light beam may be increased. For example, by making the output light signal of the transmitter of the probe light beam +13 dBm and making the outputs of other signal light beams +10 dBm, the probe light beam can be about –20 dBm even when the signal light beams decrease to about –23 dBm and therefore it can be detected sufficiently by means of the light receiving unit 28. By controlling the optical amplifying medium on the basis of the thus detected value, the signal light beam outputs can be amplified from –23 dBm to +10 dBm. Accordingly, the distance between an optical amplifier and the following optical amplifier can be increased to permit longer-distance transmission.

In order to increase the mu-factor of the signal light beam gain, transmitting power of the probe light beam can otherwise be decreased. In this case, the output levels of the signal light beams are correlated to the output level of the probe light beam and the respective signal light beam outputs are so controlled as to be set to +10 dBm by changing setting of the reference voltages 31A and 31B for the probe light beam.

One of the wavelengths of the signal light beams can be used as the probe light beam. By doing so, the optical transmission system of the present invention can be built easily without additionally providing a new probe light beam. In this case, it is preferable that the probe light beam be set to a long wavelength end or a short wavelength end of signal wavelengths to be multiplexed as described hereinbefore. When the number of wavelengths to be multiplexed is four, another probe light beam may be provided but as the number of wavelengths to be multiplexed increases, the provision of a probe light beam other than signal light beams limits the amount of transmissive information and under the circumstances, the transmissive information amount can be increased by using one of the signal light beams commonly as a probe light beam. In the optical transmission system shown in FIG. 1, too, the number of transmitters can be decreased, thus simplifying the circuit construction.

In the trunk line system in the practical system, a non-uniform decrease occurs in the multiplexed wavelengths, that is, in the light output of the probe light beam $\lambda p$ and the light outputs of the signal light beams $\lambda 1, \lambda 2, \lambda 3$ and $\lambda 4$ owing to the non-linear optical effect called four-wave mixing. Accordingly, there occurs a difference between the light input level of the probe light beam $\lambda p$ and that of each of the signal light beams $\lambda 1, \lambda 2, \lambda 3$ and $\lambda 4$ and in spite of the fact that the probe light beam $\lambda p$ is controlled to +10 dBm, there is a possibility that signal light beam outputs are so controlled as to deviate from +10 dBm. But, by utilizing a non-dispersion shifted fiber for the trunk line system 9, the difference between the input level of the probe light beam and that of each of the signal light beams can be mitigated. Further, by taking measures in which the wavelength distance is made to be narrower between one of the signal light beam wavelengths, for example, $\lambda 1$ and the $\lambda p$ than between other signal light beams, the difference between the input level of the probe light beam and that of each of the signal light beams can be mitigated.

According to the present practiced form, even when one signal light beam $\lambda$ decreases or stops, other signal light beams are not affected thereby so as to be controlled to the constant level.

In the practical system, information pieces transmitted by the signal light beams $\lambda 1$, $\lambda 2$, $\lambda 3$ and $\lambda 4$ are often independent of each other. Accordingly, it is sufficiently thinkable that the signal light beams decrease or stop independently of each other. Further, in the practical system to which the optical amplifier is applied, the number of wavelengths to be multiplexed, for example, is not uniform and it is sufficiently thinkable that, for example, the optical amplifier of the multiplexing system for the four signal light beams $\lambda 1$, $\lambda 2$, $\lambda 3$ and $\lambda 4$ must be used for a multiplexing system for two signal light beams $\lambda 1$ and $\lambda 2$. Accordingly, it is important from the standpoint of system design that transmitted signals are always controlled to a constant level without depending on the signals which decrease or stop independently of each other. According to the present practiced form, even when four-wavelength multiplexing changes to two-wavelength multiplexing, the transmitted signals can always be controlled to the constant level.

Further, even when one signal light beam, for example, $\lambda 1$ light beam decreases or extinguishes, the optical gain states (outputs) of the signal light beams $\lambda 2$, $\lambda 3$ and $\lambda 4$ can be held by the gain state (output) of the probe light beam $\lambda p$ by performing feedback control such that the optical output of the probe light beam $\lambda p$ monitored by the light receiving unit 28 is kept to the predetermined value and hence they can be maintained at the predetermined value and can be stabilized. Consequently, the light outputs of $\lambda 2$, $\lambda 3$ and $\lambda 4$ wavelengths can be controlled to the same level as that available before the $\lambda 1$ signal light beam decreases or extinguishes. Accordingly, even when the number of wavelengths to be multiplexed changes in the course of the use of the optical amplifier, the signal light beams can be controlled stably without being changed in their control states. Similar control is possible even when any of the wavelengths decrease or stop and a plurality of wavelengths decrease or stop. Even when the number of multiplexed wavelengths increases to $\lambda n$, this holds true.

Accordingly, even with the number of wavelengths to be multiplexed increased, such a situation can be handled without changing the system and the circuit.

Further, from the viewpoint of reduction of laying cost, the signal multiplexing number in the system can be increased or decreased in accordance the necessity after laying, thus permitting a system capable of changing the wavelength multiplexing number with ease to be built.

Further, even when the probe light beam $\lambda p$ and the signal light beams $\lambda 1$, $\lambda 2$, $\lambda 3$ and $\lambda 4$ change at a time, they can be controlled to the constant value. In the practical system, the probe light beam $\lambda p$ and signal light beams $\lambda 1$, $\lambda 2$, $\lambda 3$ and $\lambda 4$ often change at a time owing to fiber operation by the operator and deflection of the optical fiber. Even in such a situation, a variation in the probe light beam $\lambda p$ can be suppressed and can be controlled to the predetermined value and as a result, other wavelengths, that is, the signal light beams $\lambda 1$, 2, $\lambda 3$ and $\lambda 4$ together with the probe light beam can be maintained at the predetermined value and stabilized.

Since the conventional scheme is one in which the total light output is controlled to a constant value, feedback control is performed such that the total light output of wavelengths $\lambda 2$, $\lambda 3$ and $\lambda 4$ is kept to be constant in the event that, for example, the $\lambda 1$ signal light beam decreases or extinguishes. Consequently, the light output of each of the wavelengths $\lambda 2$, $\lambda 3$ and $\lambda 4$ is dispersed to increase by an amount of decrease or extinction of $\lambda 1$ light output power. The amount multiplies each of the $\lambda 2$, $\lambda 3$ and $\lambda 4$ by about 1.3. When a plurality of wavelengths extinguish, the light output further increases, making it impossible to keep constant each output which is the essential control target.

In the event that the probe light beam per se becomes abnormal, all of the multiplexed light beams can be controlled to the constant value and therefore, even in the event of such abnormality, recovery of the system can be deal with while maintaining a suitable system state.

Next, another practiced form of the optical amplifier will be described with reference to FIG. 3.

Figure 3:
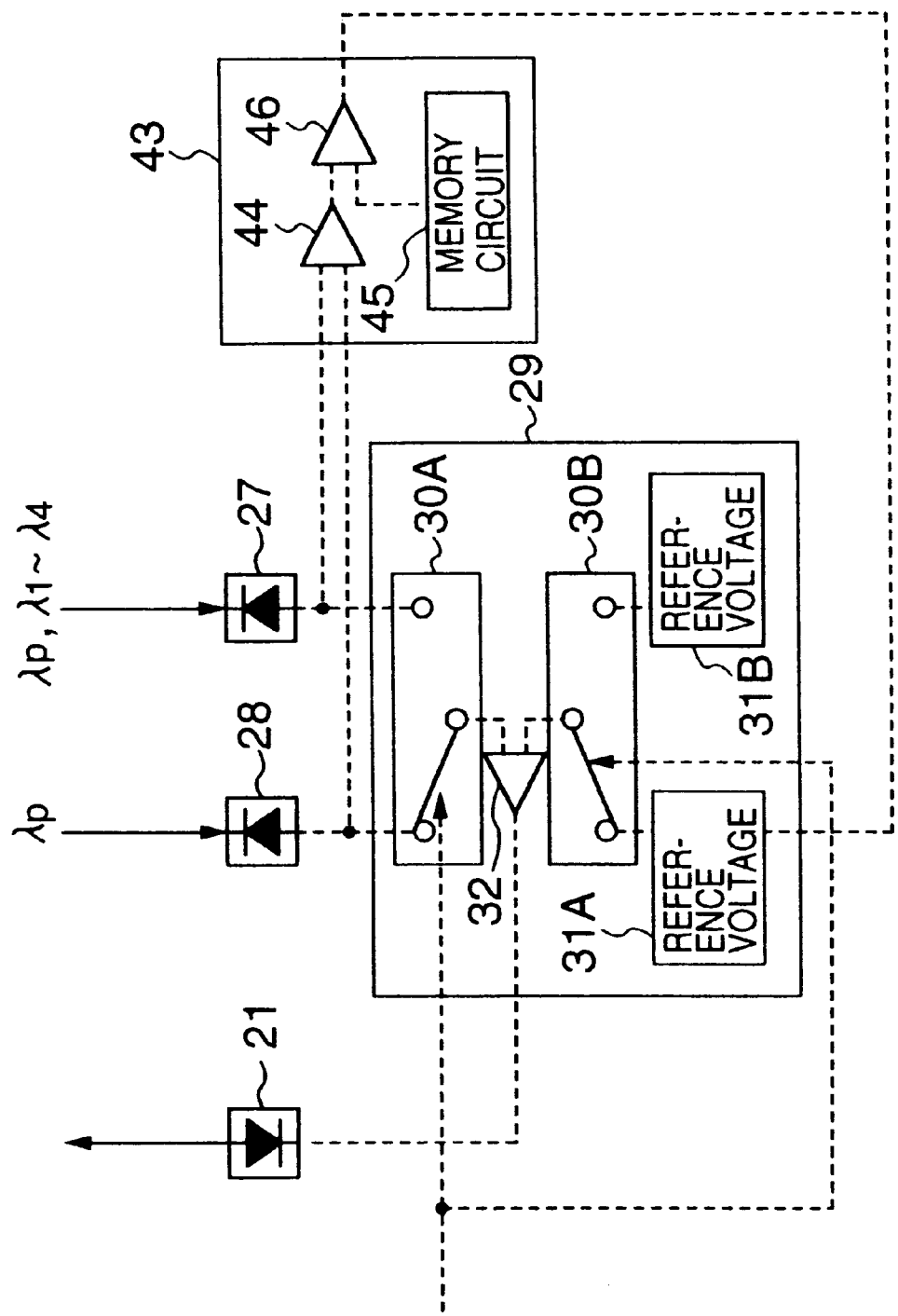
FIG. 3 is a block circuit diagram showing another embodiment of a control system for controlling the optical amplifying medium in FIG. 2.

FIG. 3 is a block diagram showing the essential part of an optical amplifier according to another practiced form of the present invention. Identical reference numerals to those in FIG. 2 designate identical parts.

Automatic correcting means 43 includes a difference circuit 44, a memory circuit 45 and a comparator 46. The difference circuit 44 is adapted to extract a difference between a light output of each of the wavelengths $\lambda p$, $\lambda 1$, $\lambda 2$, $\lambda 3$ and $\lambda 4$ which are monitored by the light receiving unit 27 and a light output of $\lambda p$ monitored by the light receiving unit 28 and it can remove a monitored value of the probe light beam $\lambda p$ from multiplexed light beam monitored values to ensure output power of all of the signal light beams $\lambda 1$, $\lambda 2$, $\lambda 3$ and $\lambda 4$ to be monitored. All output power levels of the signal light beams $\lambda 1$, $\lambda 2$, $\lambda 3$ and $\lambda 4$ upon initial adjustment are stored in the form of voltage values in a flash memory standing for the memory circuit 45. The comparator 46 compares the levels stored in the memory circuit 45 with all output power levels upon laying and the reference voltage 31A for the probe light beam is changed in accordance with an error during the comparison.

With this construction, for example, on the assumption that when an output power level of all the signal light beams $\lambda 1$, $\lambda 2$, $\lambda 3$ and $\lambda 4$ upon initial adjustment which is 4.0V is stored, an output power level of each of all the signal light beams upon laying shifts to 3.5V and a voltage value from the difference circuit 44 is 0.5V, the reference voltage 31A of the probe light beam is changed so that the above voltage becomes 0V. As a result, the output power of each of all the signal light beams can be set readily and steadily to the same level for the initial adjustment period and the laying period.

According to the present practiced form, the output power of each of all the signal light beams can be set to the same level for the initial adjustment period and the laying period.

Figure 4:
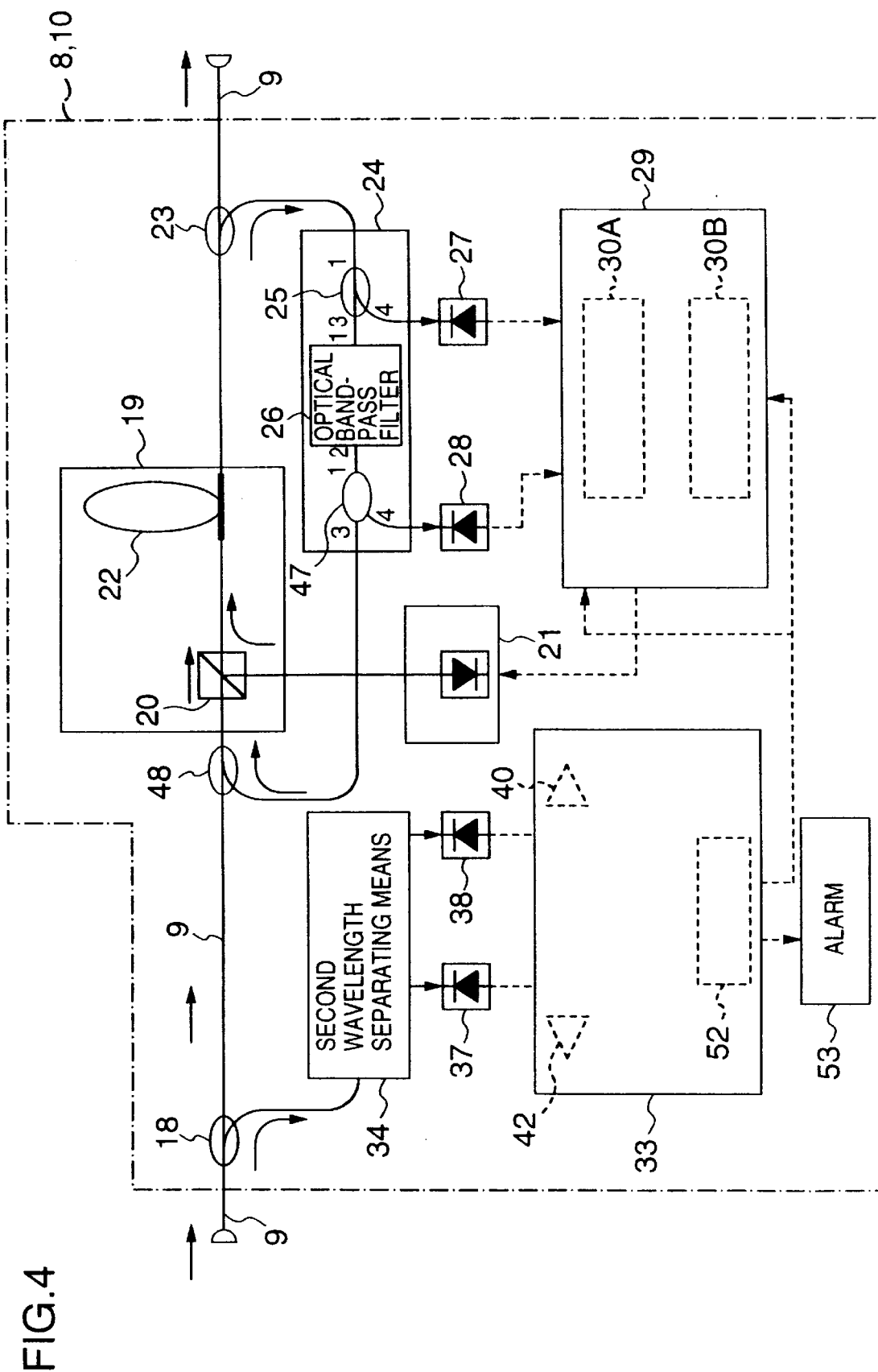
FIG. 4 is a block circuit diagram showing another embodiment of wavelength separating means in FIG. 2.

Next, a third embodiment of the optical amplifier of the present invention will be described with reference to FIG. 4. In FIG. 4, too, parts described in connection with FIG. 2 are designated by identical reference numerals. Essentially, FIG. 4 shows a modified example of the first wavelength separating means 24 in FIG. 2 and so parts other than the wavelength separating means have already been described in connection with FIG. 2. Accordingly, a description of those parts will be omitted.

In FIG. 4, an output signal from a port 3 of a 50:50 optical coupler 47 is combined with an input light beam by means of a 5:95 optical coupler 48. When abnormality occurs in the trunk line system 9 and the input to the optical amplifier is stopped or decreased, the gain state of the erbium added optical fiber 22 is increased to maintain the monitor level for the probe light beam at a constant value and a spontaneous discharge light beam standing for an optical noise component increases. Of the spontaneous discharge light beam branched by the 5:95 optical coupler 23, only a light beam corresponding to the probe light beam $\lambda p$ passes through the optical filter 26 and combined with the input light beam by means of the 50:50 optical coupler 47 and 5:95 optical coupler 48, so that a state is established in which a probe light beam is inputted as if normally. This ensures that a constant probe light beam is transmitted to the stage following the optical amplifier 8 or 10.

With the above construction, the alarm circuit 53 raises the alarm to permit abnormality in the trunk line system 9 preceding the optical amplifier 8 or 10 to be indicated and at the same time, for the succeeding trunk line system 9, the state is set up in which the probe light beam is inputted as if normally, so that in the absence of abnormality especially occurring in the succeeding trunk line system, the alarm circuit of the succeeding optical amplifier 8 or 10 is not actuate and accordingly, the presence or absence of abnormality in the succeeding trunk line system 9 can be detected independently of detection of abnormality in the preceding stage, thereby improving the reliability of the system.

When the 50:50 optical coupler 47 and 5:95 optical coupler 48 are not used, abnormality of the probe light beam occurring in the whole of the trunk line system is detected by the individual optical amplifiers and all alarm circuits connected to the trunk line system raise the alarm, with the result that it takes time to investigate which stage of the trunk line system the abnormality occurs in.

Since, inside the wavelength separating means 24, the wavelength band of the probe light beam substantially coincides with the pass-band of the optical band-pass filter, it is preferable that the pass-band of the optical band-pass filter be as narrow as possible.

The probe light beam to be transmitted to the succeeding stage may independently be provided in the optical amplifier by using, for example, a semiconductor laser having the oscillation wavelength $\lambda p$. In this case, the output from the semiconductor laser may be combined by the 5:95 optical coupler 48.

According to the present practiced form, even when one signal light beam $\lambda$ decreases or stops, this does not affect other signal light beams to make it possible to control them to the constant level.

Further, the presence or absence of abnormality in the succeeding stage of the trunk line system can be detected independently of detection of abnormality in the preceding stage without causing abnormality in the trunk line to affect the succeeding stage and the reliability of the system can be improved.

Next, a fourth practiced form of the optical amplifier will be described with reference to FIG. 5.

Figure 5:
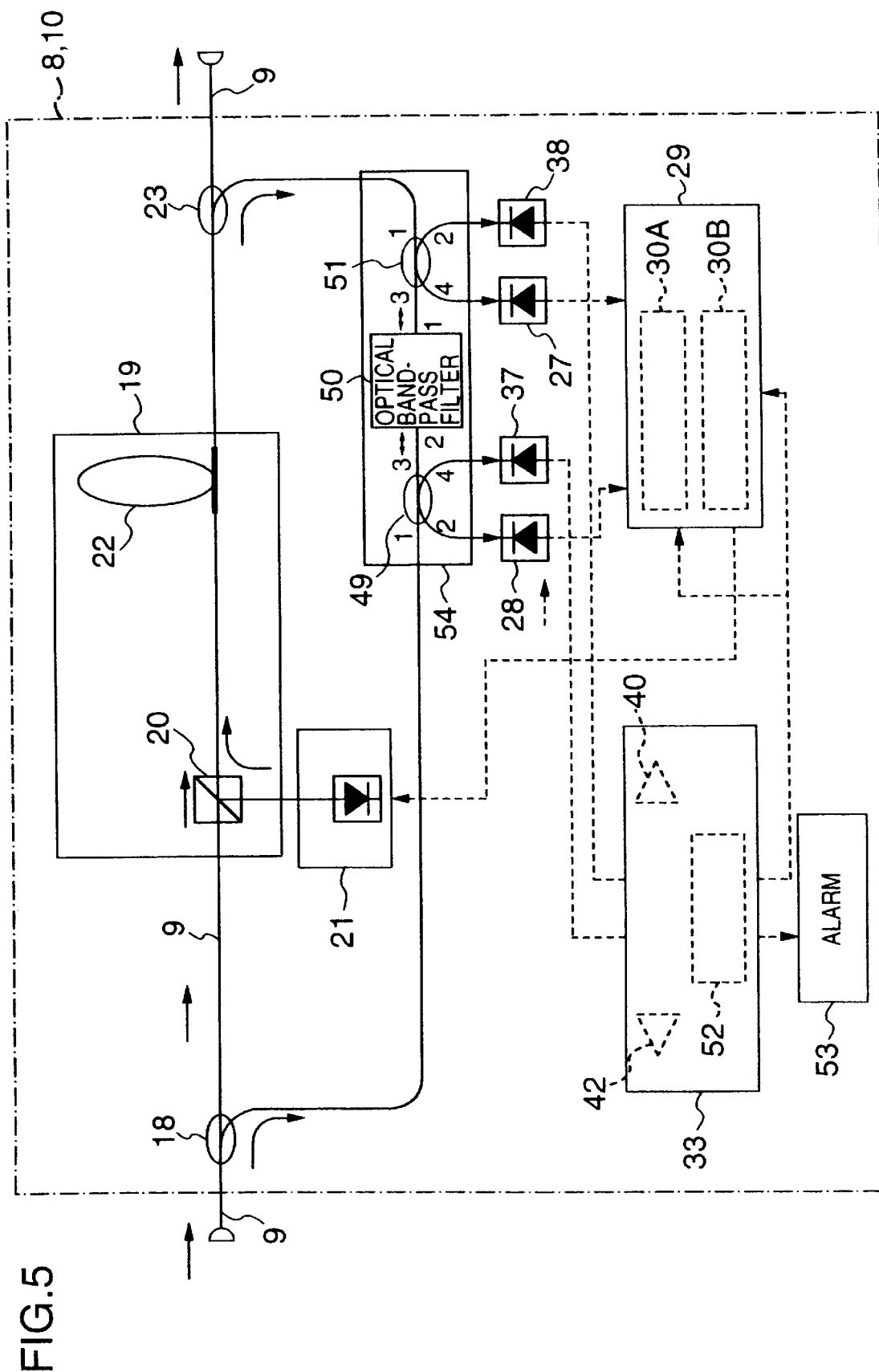
FIG. 5 is a block circuit diagram showing still another embodiment of the wavelength separating means in FIG. 2.

FIG. 5 is a functional block diagram of an optical amplifier according to the fourth practiced form of the present invention.

The probe light beam $\lambda p$ and signal light beams $\lambda 1, \lambda 2, \lambda 3$ and $\lambda 4$ are inputted to an input terminal of the optical amplifier 8 or 10 through the same optical fiber. Most of the inputted probe light beam $\lambda p$ and signal light beams $\lambda 1, \lambda 2, \lambda 3$ and $\lambda 4$ pass through the 5:95 optical coupler 18 standing for first light branching means so as to be inputted to the optical amplifying medium 19.

The light beam guided to an input terminal of the erbium added optical fiber 22 included in the optical amplifying medium 19 is amplified inside the erbium added optical fiber 22 and delivered from an output terminal. Most of the delivered light beam passes through the 5:95 optical coupler 23 standing for second light branching means and is delivered from an output terminal of the optical amplifier 8 or 10 to the trunk line system 9.

Part of the light beam is branched by the 5:95 optical coupler 23 so as to be inputted to wavelength separating means 54. The wavelength separating means 54 plays the role of the two of the wavelength separating means 24 and 34 in FIG. 2. The wavelength separating means 54 includes a 50:50 optical coupler 49, an optical band-pass filter 50 having a pass-wavelength band of $\lambda p \pm 1$ nm and a 50:50 optical coupler 51.

The light beam inputted from a port 1 of the 50:50 optical filter 51 is 50:50 branched from ports 4 and 3 and the probe light beam $\lambda p$ and the signal light beams $\lambda 1, \lambda 2, \lambda 3$ and $\lambda 4$ are delivered. The light beam delivered out of the port 3 of the 50:50 optical coupler 51 is inputted to the optical band-pass filter 50 through a port 1 and only the $\lambda p$ light beam standing for the probe light beam is passed through a port 2.

Of the thus separated light beams, the probe light beam $\lambda p$ and signal light beams $\lambda 1, \lambda 2, \lambda 3$ and $\lambda 4$ which are delivered out of the port 4 of the 50:50 optical coupler 51 are monitored by a first light receiving unit 27 and the $\lambda p$ probe light beam delivered out of the port 2 of the optical band-pass filter 50 is inputted to a port 3 of the 50:50 optical coupler 49 and is 50:50 branched so as to be delivered out of ports 1 and 2. A light beam delivered out of the port 2 is monitored by a second light receiving unit 28.

The controller 29 feedback-controls the drive current of the pump laser 21 such that input monitor signals become constant. For detailed description of the circuit construction, reference can be made to FIG. 2.

When the trunk line system is normal and the probe light beam is inputted normally, the drive current of the pump laser 21 is feedback-controlled such that a light output of the probe light beam $\lambda p$ monitored by the light receiving unit 28 is kept to be constant. Through this, a gain state inside the erbium added optical fiber 22 can be kept to be constant and hence optical gain states (outputs) of the plurality of signal light beams $\lambda 1, \lambda 2, \lambda 3$ and $\lambda 4$ which are inputted concurrently can also be kept to be constant. As a result, light outputs of the signal light beams $\lambda 1, \lambda 2, \lambda 3$ and $\lambda 4$ can be maintained at a predetermined value and can be stabilized. Here, the optical amplifier 19 may be a semiconductor optical amplifier and in this case, the pump laser 21 provides an exciting current.

On the other hand, the probe light beam $\lambda$ and signal light beams $\lambda 1, \lambda 2, \lambda 3$ and $\lambda 4$ partly branched by the first 5:95 optical coupler 18 are inputted to the wavelength separating means 54. The 50:50 optical coupler 49 delivers the probe light beam $\lambda p$ and signal light beams $\lambda 1, \lambda 2, \lambda 3$ and $\lambda 4$ from the port 1 to a port 4. A light beam from the port 3 of the 50:50 optical coupler 49 is inputted to the port 2 of the optical band-pass filter 50 and only the $\lambda p$ light beam standing for the probe light beam is passed through the port 1. Of the thus separated light beams, the probe light beam $\lambda p$ and signal light beams $\lambda 1$, $\lambda 2$, $\lambda 3$ and $\lambda 4$ which are delivered out of the port 4 of the 50:50 optical coupler 49 are monitored by a third light receiving unit 37 and the probe light beam p delivered out of the port 1 of the optical band-pass filter 50 is monitored by a fourth light receiving unit 38.

The probe light beam $\lambda p$ is constantly generated. Therefore, when the probe light beam is higher than the predetermined value, the connection state of the trunk line system 9 is determined to be good and the input detecting unit 33 delivers a command to the controller 29 so that the output monitored by the light receiving unit 28 may become constant and the drive current of the pump laser 21 may be feedback-controlled such that the light output of the probe light beam $\lambda p$ is kept to be constant.

When the probe light beam $\lambda p$ monitored by the light receiving unit 38 is lower than the predetermined value and the probe light beam $\lambda p$ and signal light beams $\lambda 1$, $\lambda 2$, $\lambda 3$ and $\lambda 4$ which are monitored by the light receiving unit 37 are higher than the predetermined value, it is determined that the probe light beam $\lambda p$ by itself becomes abnormal and the input detecting unit 33 transmits the second operation signal to the controller 29 so that the output of the light receiving unit 28 may be controlled such that it becomes equal to the reference voltage. At that time, the probe light beam $\lambda p$ by itself is determined to be abnormal in spite of the fact that the trunk line system 9 is normal and the drive current of the pump laser 21 is feedback-controlled such that light outputs of the signal light beams $\lambda 1$, $\lambda 2$, $\lambda 3$ and $\lambda 4$ which are monitored by the light receiving unit 37 can be kept to be constant. In this manner, signal light beam output levels can be controlled such that they are not raised abnormally in the absence of the probe light beam $\lambda p$. At that time, given that the transmitted signal output of each of the signal light beams $\lambda 1$, $\lambda 2$, $\lambda 3$ and $\lambda 4$ is 10 dBm, the output of each of all the four multiplexed signal light beams $\lambda 1$, $\lambda 2$, $\lambda 3$ and $\lambda 4$ is controlled to +16 dBm.

In the event that the probe light beam by itself is suddenly stopped, the alarm is transmitted, at a speed of about 500 $\mu$s, from the operation designating circuit in the input detecting unit 33 to the selectors of the controller 29. Receiving this signal, the selectors are switched at a speed of about 50 $\mu$s. Since the erbium added optical fiber 22 has a response time of about 1 to 10 ms which is sufficiently slower than the alarm transmitting speed, the whole optical power can be controlled without causing the light output to be increased abruptly and excessively.

By repairing the probe light beam while the second operation signal is generated, that is, while the light outputs of the signal light beams $\lambda 1$, 12, $\lambda 3$ and $\lambda 4$ are kept to be constant, a suitable system state can be maintained without making the signal transmission abnormal and the reliability of the system can be improved.

Instead of using the two reference voltages and switching them for use, a single reference voltage can alternatively be used by making sensitivity of the light receiving unit 27 lower than that of the light receiving unit 28 such that, for example, an output electric signal has the same value when a light signal of 10 dBm is inputted to the light receiving unit 28 as when a light signal of 16 dBm is inputted to the light receiving unit 27.

When the probe light beam $\lambda p$ monitored by the light receiving unit 38 is lower than the predetermined value and the probe light beam $\lambda p$ and signal light beams $\lambda 1$, $\lambda 2$, $\lambda 3$ and $\lambda 4$ which are monitored by the light receiving unit 37 are also lower than the predetermined value, it is determined that the trunk line system is abnormal and the operation designating circuit in the input detecting unit 33 sends the third operation signal to the alarm circuit 53 to cause it to raise the alarm.

Alternatively, control may be performed such that the third operation signal is used to lower the drive current of the pump laser 21 so as to prevent superfluous optical amplification.

In order to set the light outputs of the plurality of wavelengths $\lambda 1$, $\lambda 2$, $\lambda 3$ and $\lambda 4$ to the same level as far as possible, it is preferable to use the erbium added optical fiber 22 in which flatness of the gain is realized as far as possible within the region of wavelengths to be multiplexed.

In the present practiced form, transmitting power of the probe light beam equals that of other wavelengths but for facilitation of detection, transmitting power of the probe light beam may be increased. For example, by making the output light signal of the transmitter of the probe light beam +13 dBm and making the outputs of other signal light beams +10 dBm, the probe light beam can be about −20 dBm even when the signal light beams decrease to about −30 dBm and therefore it can be detected sufficiently by means of the light receiving unit 28. By controlling the optical amplifying medium on the basis of the thus detected value, the signal light beam outputs can be amplified from −30 dBm to +10 dBm.

In order to increase the mu-factor of the signal light beam gain, transmitting power of the probe light beam can otherwise be decreased. In this case, the output levels of the signal light beams are correlated to the output level of the probe light beam and the respective signal light beam outputs are controlled such that they are set to +10 dBm by changing setting of the reference voltages 31A and 31B for the probe light beam.

One of the wavelengths of the signal light beams can be used as the probe light beam. By doing so, the optical transmission system of the present invention can be built easily without additionally providing a new probe light beam. In this case, it is preferable that the probe light beam be set to a long wavelength end or a short wavelength end of signal wavelengths to be multiplexed as described previously. When the number of wavelengths to be multiplexed is four, another probe light beam may be provided but as the number of wavelengths to be multiplexed increases, the provision of a probe light beam other than signal light beams limits the amount of transmissive information and under the circumstances, the transmissive information amount can be increased by using one of the signal light beams commonly as a probe light beam. In the optical transmission system shown in FIG. 1, too, the number of transmitters can be decreased, thus simplifying the circuit construction.

In the trunk line system in the practical system, a non-uniform decrease occurs in the multiplexed wavelengths, that is, in light outputs of the $\lambda p$ and the $\lambda 1$, $\lambda 2$, $\lambda 3$ and $\lambda 4$ owing to the non-linear optical effect called four-wave mixing. Accordingly, there occurs a difference between the light output level of the $\lambda p$ and that of each of the $\lambda 1$, $\lambda 2$, $\lambda 3$ and $\lambda 4$ and in spite of the fact that the probe light beam is controlled to +10 dBm, there is a possibility that signal beam outputs are controlled such that they deviate from +10 dBm. But, by using a non-dispersion shifted fiber for the trunk line system 9, the difference between the input levels, fed to the optical amplifier, of the probe light beam and signal light beams can be mitigated. Further, by taking measures in which the wavelength distance is made to be narrower between one of the signal light beam wave lengths, for example, λ1 and the λp than between other signal light beams, the difference between the input levels, fed to the optical amplifier, of the probe light beam and signal light beams can be mitigated.

According to the present practiced form, even when one signal light beam λ decreases or stops, other signal light beams are not affected thereby so as to be controlled to the constant level.

With the above construction, the number of optical filters and optical couplers can be reduced and the construction of the wavelength separating means can be simplified.

Next, another practiced form of the optical transmission system of the present invention will be described with reference to FIG. 6.

The system construction of FIG. 6 differs from FIG. 1 in that a transmission system uses a plurality of probe light beams.

A probe light beam having a wavelength λp is used in correspondence to signal wavelengths λ1 to λ4 and the mu-factor of an optical amplifier 8 is controlled such that each of the signal light beams λ1 to λ4 and the probe light beam λp are set to +10 dBm or more. At the same time, a probe light beam having a wavelength λp' is used in correspondence to wavelengths of signal wavelengths λ1' to λ4' and the mu-factor of the optical amplifier 8 is controlled such that each of the signal light beams λ1' to λ4' and the probe light beam λp' are set to +10 dBm or more. Consequently, the separate probe light beams λp and λp' are used to control the mu-factor of the optical amplifier 8 such that each of the signal wavelengths λ1 to λ4 and each of the signal wavelengths λ1' to λ4' are steadily set to +10 dBm or more.

While the number of wavelengths in the figure is four in each group, the wavelength number is not always limited to four but may be different for the respective groups. The number of the separately provided probe light beams is two in the figure but it is not limitative.

If in the optical transmission system a single probe light beam is used to control all of other signal light beams when the number of wavelengths of signal light beams increased, then there will be a possibility that a difference occurs between power of the probe light beam and that of other signal light beam wavelengths and a wavelength occurs which is unstable to the probe light beam. Especially when the wavelength of the probe light beam is distant from wavelengths of signal light beams, such a phenomenon as above is liable to occur. With the construction of FIG. 6, however, an increased number of wavelengths are divided into groups each of which is separately monitored by the probe light beam and therefore, all signals can steadily be amplified and delicate and fine feedback control can be ensured.

Through this, an optical transmission system of high reliability and safety can be built.

According to the present invention, in the optical amplifier and the optical transmission system using it, the individual wavelength outputs can be controlled without affecting amplification of other light signals and without greatly affecting the signal transmission even when the number of signal wavelengths to be multiplexed changes.

What is claimed is:

1. An optical transmission path monitoring and controlling method comprising the steps of monitoring a probe light beam and other multiplexed light beams which are included in a multiplex light ray propagated through a transmission path in an optical transmission system, detecting values of the monitored probe light beam and the other multiplexed light beams, while the other multiplexed light beams are in a multiplexed state, in relation to predetermined values, respectively, and determining based upon the detected value whether or not at least one of an optical transmission path trunk line, the probe light beam per se, the other multiplexed light beams per se, an optical amplifier and a transmitter is normal.

2. An optical transmission path monitoring method according to claim 1, wherein said trunk line is determined to be normal when the probe light beam is above the predetermined value and the other multiplexed light beams are above the predetermined value.

3. An optical transmission path monitoring and controlling method according to claim 1, wherein said trunk line is determined to be normal when the probe light beam is above the predetermined value and the other multiplexed light beams are above the predetermined value, further comprising the steps of monitoring the probe light beam from said optical amplifier, and for controlling an output of the probe light beam or outputs of the other multiplexed light beams using a result of the monitoring.

4. An optical transmission path monitoring method according to claim 1, wherein when the probe light beam is above the predetermined value and the other multiplexed light beams are below the predetermined value, the other multiplexed light beams are determined to be abnormal.

5. An optical transmission path monitoring and controlling method according to claim 1, wherein when the probe light beam is above the predetermined value and the other multiplexed light beams are below the predetermined value, the other multiplexed light beams are determined to be abnormal, and a gain mu-factor of said optical amplifier is decreased or stopped.

6. An optical transmission path monitoring method according to claim 1, wherein when the probe light beam is below the predetermined value and the other multiplexed light beams are above the predetermined value, the probe light beam is determined to be abnormal.

7. An optical transmission path monitoring and controlling method according to claim 1, wherein when the probe light beam is below the predetermined value and the other multiplexed light beams are above the predetermined value, the probe light beam is determined to be abnormal, further comprising the steps of monitoring the other multiplexed light beams from said optical amplifier, and controlling outputs of the other multiplexed light beams using a result of the monitoring.

8. An optical path monitoring method according to claim 1, wherein when the probe light beam is below the predetermined value and the other multiplexed light beams which are signal light beams are below the predetermined value, said trunk line system or said transmitter is determined to be abnormal.

9. An optical path monitoring and controlling method according to claim 1, wherein when the probe light beam is below the predetermined value and the other multiplexed light beams which are signal light beams are below the predetermined value, said trunk line system or said transmitter is determined to be abnormal, and a gain mu-factor of said optical amplifier is decreased or stopped.

10. An optical transmission path monitoring and controlling method according to claim 1:
wherein said trunk line is determined to be normal when the probe light beam is above the predetermined value and the other multiplexed light beams are above the predetermined value;

wherein when the probe light beam is above the predetermined value and the other multiplexed light beams are below the predetermined value, the other multiplexed light beams are determined to be abnormal;

wherein when the probe light beam is below the predetermined value and the other multiplexed light beams are above the predetermined value, the probe light beam is determined to be abnormal; and wherein when the probe light beam is below the predetermined value and the signal light beams are below the predetermined value, said trunk line system or said transmitter is determined to be abnormal.

11. An optical transmission path monitoring and controlling method according to claim 1:

wherein said trunk line is determined to be normal when the probe light beam is above the predetermined value and the other multiplexed light beams are above the predetermined value further comprising the steps of monitoring the probe light beam from said optical amplifier, and for controlling an output of the probe light beam or outputs of the other multiplexed light beams using a result of the monitoring;

wherein when the probe light beam is above the predetermined value and the other multiplexed light beams are below the predetermined value, the other multiplexed light beams are determined to be abnormal, and a gain mu-factor of said optical amplifier is decreased or stopped;

wherein when the probe light beam is below the predetermined value and the other multiplexed light beams are above the predetermined value, the probe light beam is determined to be abnormal, further comprising the steps of monitoring the other multiplexed light beams from said optical amplifier and controlling outputs of the other multiplexed light beams using a result of the monitoring; and wherein when the probe light beam is below the predetermined value and the signal light beams are below the predetermined value, said trunk line system or said transmitter is determined to be abnormal, and a gain mu-factor of said optical amplifier is decreased or stopped.

\* \* \* \* \*